(12) United States Patent
Mishima (10) Patent No.: US 12,204,048 B2
(45) Date of Patent: Jan. 21, 2025

(54) COLLISION AVOIDANCE APPARATUS AND COLLISION AVOIDANCE METHOD FOR AUTONOMOUS VEHICLE

(71) Applicant: OMRON Corporation, Kyoto (JP)

(72) Inventor: Kazuma Mishima, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/631,180

(22) PCT Filed: Mar. 5, 2020

(86) PCT No.: PCT/JP2020/009400
§ 371 (c)(1),
(2) Date: Jan. 28, 2022

(87) PCT Pub. No.: WO2021/033354
PCT Pub. Date: Feb. 25, 2021

(65) Prior Publication Data
US 2024/0045024 A1  Feb. 8, 2024

(30) Foreign Application Priority Data

Aug. 20, 2019 (JP) ................. 2019-150403

(51) Int. Cl.
*G01S 7/41* (2006.01)
*G01S 13/931* (2020.01)

(52) U.S. Cl.
CPC ............ *G01S 7/412* (2013.01); *G01S 13/931* (2013.01)

(58) Field of Classification Search
CPC ...... G01S 7/412; G01S 13/931; G01S 7/2925; G01S 7/354; G01S 7/411; G01S 7/414; G08G 1/165; G08G 1/166; B60W 60/0016
See application file for complete search history.

(56) References Cited

U.S. PATENT DOCUMENTS 7,755,534 B2 * 7/2010 Samukawa ........... G01S 13/345
                                                          342/438
8,665,079 B2 * 3/2014 Pawlicki ............... G01S 13/867
                                                          340/436

(Continued)

FOREIGN PATENT DOCUMENTS

CN      1535374 A    10/2004
CN    103245944 A     8/2013
(Continued)

OTHER PUBLICATIONS

International Search Report issued in Intl. Appln. No. PCT/JP2020/009400 mailed May 26, 2020. English translation provided.

(Continued)

*Primary Examiner* — Peter M Bythrow
(74) *Attorney, Agent, or Firm* — ROSSI, KIMMS & McDOWELL LLP (57) ABSTRACT

The technique allows avoiding collision with an object that is difficult to detect with a radar sensor. A collision avoidance apparatus is an apparatus for an autonomous vehicle including at least one radar sensor for transmitting a radar wave and receiving a reflected wave from an object. The apparatus includes a processor that obtains, from a signal received by the at least one radar sensor, information about a position of the object and information about a reflected power level of the reflected wave, a generator that generates, in response to the reflected power level being higher than or equal to a predetermined value, information about a travel-restricted area being an area adjacent to the object and in which the autonomous vehicle is restricted from traveling, and an output unit that outputs the information about the travel-restricted area.

6 Claims, 4 Drawing Sheets

(56) References Cited

U.S. PATENT DOCUMENTS

| | | | |
|---|---|---|---|
| 10,877,139 B2 * | 12/2020 | Fischer | G05D 1/0257 |
| 2007/0241870 A1 | 10/2007 | Ohmura | |
| 2009/0262188 A1 | 10/2009 | Hoki | |
| 2011/0094299 A1 | 4/2011 | Müller et al. | |
| 2012/0127016 A1 * | 5/2012 | Watanabe | G01S 13/34 |
| | | | 342/146 |
| 2013/0207832 A1 * | 8/2013 | Mizutani | G01S 13/06 |
| | | | 342/107 |
| 2013/0207834 A1 * | 8/2013 | Mizutani | G01S 7/411 |
| | | | 342/107 |
| 2013/0218467 A1 | 8/2013 | Ogawa et al. | |
| 2013/0249731 A1 * | 9/2013 | Kurono | G01S 7/412 |
| | | | 342/146 |
| 2013/0311077 A1 * | 11/2013 | Ichida | G08G 1/165 |
| | | | 701/300 |
| 2016/0170020 A1 * | 6/2016 | Hamada | G01S 13/723 |
| | | | 342/70 |
| 2018/0172825 A1 | 6/2018 | Hsu et al. | |
| 2018/0348364 A1 * | 12/2018 | Liu | G01S 13/91 |
| 2019/0329745 A1 * | 10/2019 | Ito | G08G 1/166 |
| 2020/0278440 A1 * | 9/2020 | Wang | G01S 13/584 |

FOREIGN PATENT DOCUMENTS

| | | |
|---|---|---|
| CN | 103364778 A | 10/2013 |
| CN | 103792531 A | 5/2014 |
| CN | 108983164 A | 12/2018 |
| DE | 102009016480 A1 | 10/2010 |
| DE | 102017216567 A1 | 3/2019 |
| JP | H0926826 A | 1/1997 |
| JP | 2001215273 A | 8/2001 |
| JP | 2003302462 A | 10/2003 |
| JP | 2007280144 A | 10/2007 |
| JP | 2009259086 A | 11/2009 |
| JP | 2012112653 A | 6/2012 |
| JP | 2013019684 A | 1/2013 |
| JP | 2013242660 A | 12/2013 |
| JP | 2017009572 A | 1/2017 |
| JP | 2018054328 A | 4/2018 |
| JP | 2018096747 A | 6/2018 |
| JP | 2018114774 A | 7/2018 |
| WO | 2012014280 A1 | 2/2012 |

OTHER PUBLICATIONS

Written Opinion issued in Intl. Appln. No. PCT/JP2020/009400 mailed May 26, 2020. English translation provided.

Office Action issued in Korean Appln. No. 10-2022-7002291 mailed Dec. 1, 2023. English translation provided.

Extended European search report issued in European Appln. No. 20854076.5 mailed on Jun. 9, 2023.

Office Action issued in Chinese Appln. No. 202080052549.9, mailed Aug. 26, 2023. English translation provided.

Office Action issued in Japanese Appln. No. 2019-150403 mailed Oct. 31, 2023. English translation provided.

* cited by examiner

COLLISION AVOIDANCE APPARATUS AND COLLISION AVOIDANCE METHOD FOR AUTONOMOUS VEHICLE

TECHNICAL FIELD

The present invention relates to a collision avoidance apparatus, a collision avoidance method, and a collision avoidance program for an autonomous vehicle.

BACKGROUND

Known automated guided vehicles (AGVs) travel along routes while detecting obstacles ahead with laser radar in factories and warehouses. A known technique includes extracting an obstacle located within the path width of a route from obstacles detected with laser radar, and decelerating or stopping an AGV based on the extracted obstacle (refer to, for example, Patent Literature 1).

CITATION LIST

Patent Literature

Patent Literature 1: Japanese Unexamined Patent Application Publication No. 09-026826

SUMMARY

Technical Problem

Known laser radar can detect, for example, objects in a two-dimensional plane, but may have difficulty with detecting objects in a three-dimensional space. In contrast, millimeter wave radar, for example, can detect objects in a three-dimensional space. For example, an object (e.g., a metal wall) that reflects a wave with a relatively high level of reflected power is present, and another object that reflects a wave with a relatively low level of reflected power is located in front of the object. The reflected wave from the other object having the relatively low level of reflected power may be superimposed on the reflected wave from the object having the relatively high level of reflected power. These reflected waves may not be easily separated from each other with millimeter wave radar. This may thus cause difficulty in detecting the other object. To increase the separation resolution with millimeter wave radar, more antennas may be used, for example. However, using more antennas may increase the size of the radar system or cause an existing system to be unusable, possibly increasing the cost.

In response to the above issue, one or more aspects of the present invention are directed to avoiding collision with an object that is difficult to detect with a radar sensor.

Solution to Problem

A collision avoidance apparatus according to an aspect of the present invention is an apparatus for an autonomous vehicle including at least one radar sensor for transmitting a radar wave and receiving a reflected wave from an object. The apparatus includes a processor that obtains, from a signal received by the at least one radar sensor, information about a position of the object and information about a reflected power level of the reflected wave, a generator that generates, in response to the reflected power level being higher than or equal to a predetermined value, information about a travel-restricted area being an area adjacent to the object and in which the autonomous vehicle is restricted from traveling, and an output unit that outputs the information about the travel-restricted area.

The apparatus with this structure defines a travel-restricted area adjacent to an object in response to a reflected wave from the object having a reflected power level higher than or equal to the predetermined value. For example, an object having a high level of reflected power is detected, and another object having a low level of reflected power undetectable with the radar sensor (hereafter also simply referred to as another object or the other object) is located adjacent to the object. The apparatus then defines a travel-restricted area including the other object. The autonomous vehicle (hereafter also simply referred to as a vehicle) then travels in an area other than the travel-restricted area and can avoid the other object having the low level of reflected power. The predetermined value is, for example, a reflected power level at which another object located adjacent to a detected object is undetectable or is likely to be undetectable.

The radar sensor may use, for example, millimeter wave radar. The radar sensor may use any radar, such as frequency modulated continuous wave (FMCW) radar or pulse radar. The radar sensor receives a reflected wave from an object such as an obstacle located around a vehicle, for example. The radar sensor may include multiple receiving antennas. The radar sensor including multiple receiving antennas can detect the position of an object in a three-dimensional space. The processor obtains, based on a signal received by the radar sensor, information about the position of the object and information about the reflected power level of the reflected wave. The information about the position of the object includes information about the positions of multiple points (point cloud) forming the object. The information about the reflected power level includes information about the reflected power levels for the positions.

The reflected power level of the reflected wave from an object is proportional to the radar cross-section (RCS) of the object from the radar equation. In other words, the reflected power level is higher for a larger RCS. For example, an object having a high level of reflected power is present, and another object having a low level of reflected power is located adjacent to the object. A reflected wave from the other object having the low level of reflected power may be less noticeable in a reflected wave from the object having the high level of reflected power, causing difficulty in detecting the other object having the low level of reflected power. The generator defines a travel-restricted area adjacent to a detected object having a reflected power level higher than or equal to a predetermined value. The travel-restricted area may be defined as an area in which another object adjacent to a target object and having a lower level of reflected power than the target object is difficult to detect.

The information about the travel-restricted area may include, for example, coordinate information indicating the travel-restricted area in a three-dimensional space, information about a function or a calculation formula indicating the travel-restricted area, link data about links, or node data about nodes. The information about the travel-restricted area may include, for example, information indicating that a virtual object is located at the outer edge of the travel-restricted area.

The output unit can output the information about the travel-restricted area to the travel controller that controls the travel of the vehicle, for example. This allows the vehicle to be controlled not to enter the travel-restricted area. The vehicle can thus avoid, for example, another object having a low level of reflected power located in the travel-restricted area.

The generator may generate the information about the travel-restricted area to define a longer distance from the object to an outer edge of the travel-restricted area for the reflected power level being higher.

The reflected wave from an object having a higher level of reflected power may increase an area in which another object having a low level of reflected power is difficult to detect. Thus, the travel-restricted area may be defined to have a longer distance from the object to the outer edge of the travel-restricted area for the reflected wave from the object having a higher level of reflected power. The travel-restricted area can thus be defined in accordance with the size of the area in which the other object is difficult to detect. In other words, a larger travel-restricted area is defined for the reflected wave from the object having a higher level of reflected power. This reduces the likelihood that the vehicle collides with another object that is difficult to detect. The distance from the object to the outer edge of the travel-restricted area may be varied continuously or stepwise in accordance with the reflected power level. The distance from the object to the outer edge of the travel-restricted area may be proportional to or in any other correlation with the reflected power level.

The at least one radar sensor may include a plurality of radar sensors having different directions, and the generator may generate the information about the travel-restricted area based on a signal, among signals received by the plurality of radar sensors, having a lowest level of reflected power obtained by the processor.

The radar sensors having different directions may differ from one another in, for example, the illumination direction or in the direction in which the gain is maximized. Radar waves transmitted from the radar sensors may detect the same object. In this case, the radar wave from the transmitting antenna in each radar sensor is incident on the object at a different angle. Thus, each radar wave may cause a different reflected power level. In other words, the reflected power levels of the reflected waves from the same position may be different for different radar sensors. For an object having a lower level of reflected power of a reflected wave, another object is undetectable in a smaller area, for which a smaller travel-restricted area is to be defined. A minimum travel-restricted area can be defined based on a signal with the lowest level of reflected power. With the travel-restricted area defined in this manner, an object located outside the travel-restricted area is detectable by the radar sensor outputting the signal with the lowest level of reflected power.

A collision avoidance method according to another aspect of the present invention is a method for an autonomous vehicle including a radar sensor for transmitting a radar wave and receiving a reflected wave from an object. The method is implementable by a computer. The method includes obtaining, from a signal received by the radar sensor, information about a position of the object and information about a reflected power level of the reflected wave, generating, in response to the reflected power level being higher than or equal to a predetermined value, information about a travel-restricted area being an area adjacent to the object and in which the autonomous vehicle is restricted from traveling, and outputting the information about the travel-restricted area.

A collision avoidance program according to another aspect of the present invention is a program for an autonomous vehicle including a radar sensor for transmitting a radar wave and receiving a reflected wave from an object. The program causes a computer to perform operations including obtaining, from a signal received by the radar sensor, information about a position of the object and information about a reflected power level of the reflected wave, generating, in response to the reflected power level being higher than or equal to a predetermined value, information about a travel-restricted area being an area adjacent to the object and in which the autonomous vehicle is restricted from traveling, and outputting the information about the travel-restricted area.

The above aspects of the present invention may be implemented as a control device for an autonomous vehicle including at least some of the above components. The above aspects of the present invention may also be implemented as a control method including at least some of the above processes, or may be implemented as a program for implementing the above method or as a recording medium storing the program in a non-transitory manner. The present invention may be implemented by combining the above structures and processes in any possible manner.

Advantageous Effects

The technique according to the above aspects of the present invention allows avoiding collision with an object that is difficult to detect with a radar sensor.

DETAILED DESCRIPTION

Example Use

A collision avoidance apparatus for an autonomous vehicle according to one or more embodiments of the present invention used in one example situation will now be described. The collision avoidance apparatus for the autonomous vehicle uses a radar sensor to avoid collision of, for example, an automated guided vehicles (AGV) with an object such as an obstacle.

The collision avoidance apparatus for the autonomous vehicle obtains a reflected power level based on a signal from the radar sensor. In response to the obtained reflected power level higher than or equal to a predetermined value, the apparatus defines an area (travel-restricted area) adjacent to the object. In this area, the vehicle is restricted from traveling. For example, a metal wall having a relatively high level of reflected power is present, and another object having a relatively low level of reflected power is located in front of the metal wall. The other object having the relatively low level of reflected power may be difficult to detect. The collision avoidance apparatus for the autonomous vehicle according to one or more embodiments of the present invention defines the travel-restricted area adjacent to the metal wall to include the position of the other object. The vehicle is controlled not to enter the travel-restricted area, and can thus avoid the other object having the relatively low level of reflected power.

Embodiments (Structure of Vehicle)

Figure 1:
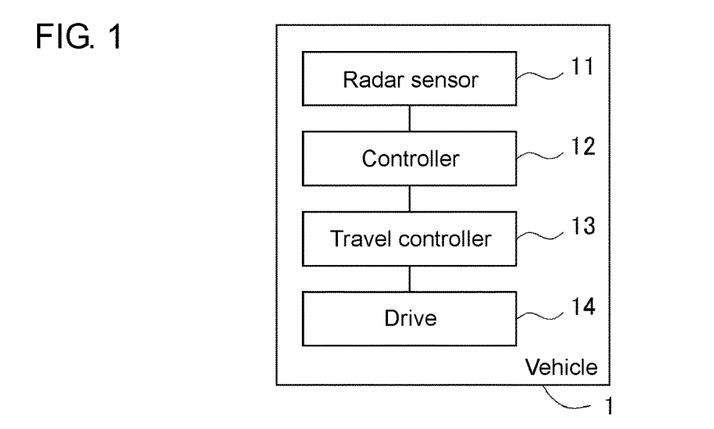
FIG. 1 is a schematic block diagram of a vehicle in an embodiment.

FIG. 1 is a schematic block diagram of a vehicle 1 in an embodiment. The vehicle 1 in the present embodiment mainly includes a radar sensor 11, a controller 12, a travel controller 13, and a drive 14. The vehicle 1 can travel autonomously and is, for example, an AGV. The vehicle 1 is an example autonomous vehicle.

The radar sensor 11 uses, for example, millimeter wave radar. The radar sensor 11 in the present embodiment may use FMCW radar. However, the radar sensor 11 may use another detection method (e.g., pulse radar). In response to the presence of an object such as an obstacle around the vehicle 1, the controller 12 processes a signal output from the radar sensor 11 to detect the distance and the direction from the vehicle 1 to the object. The controller 12 may calculate the position (e.g., three-dimensional coordinates) of the object based on the distance and the direction to the object. The controller 12 outputs information about the object to the travel controller 13. The travel controller 13 then controls the drive 14 to avoid the object.

(Structure of Radar Sensor)

Figure 2:
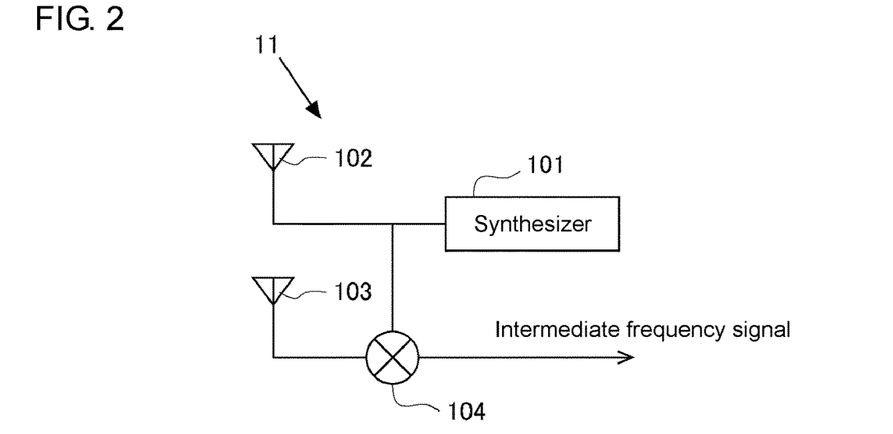
FIG. 2 is a schematic diagram of a radar sensor.

FIG. 2 is a schematic diagram of the radar sensor 11. The radar sensor 11 includes a synthesizer 101, a transmitting antenna 102, a receiving antenna 103, and a mixer 104. The synthesizer 101 generates a chirp. A chirp is a signal with the frequency that increases or decreases with time. The transmitting antenna 102 transmits a radar wave (radio wave) in accordance with the chirp. The travel direction or the illumination direction of the radar wave may be defined to align with, for example, the straight-traveling direction of the vehicle 1. The receiving antenna 103 receives a reflected wave resulting from the radar wave transmitted from the transmitting antenna 102 being reflected from an object. Multiple receiving antennas 103 may be included. To detect the position of the object three dimensionally, the radar sensor 11 in the present embodiment may include multiple receiving antennas 103 staggered horizontally and multiple receiving antennas 103 staggered vertically. The mixer 104 generates an intermediate frequency signal by combining the chirp generated by the synthesizer 101 and the signal of the reflected wave received by the receiving antenna 103. The intermediate frequency signal is output to the controller 12. The radar sensor 11 may output, to the controller 12, information for calculating the distance to the object, the direction to the object, and the reflected power level of the reflected wave from the object, for example. The radar sensor 11 may include a filter to remove unintended signal components from the output from the mixer 104 and an analog-digital converter.

(Structure of Controller)

The controller 12 will now be described. The controller 12 is a computer for performing object detection and includes, for example, a processor and a memory. The processor is, for example, a central processing unit (CPU) or a digital signal processor (DSP). The memory is, for example, a random access memory (RAM), a read-only memory (ROM), an erasable programmable ROM (EPROM), a hard disk drive (HDD), or a removable medium. The memory is a computer-readable recording medium to store various programs and other information items. The programs stored in the memory are executed by the processor to control the components. This allows the controller 12 to perform functions achieving predetermined purposes. The controller 12 may include multiple computers.

Figure 3:
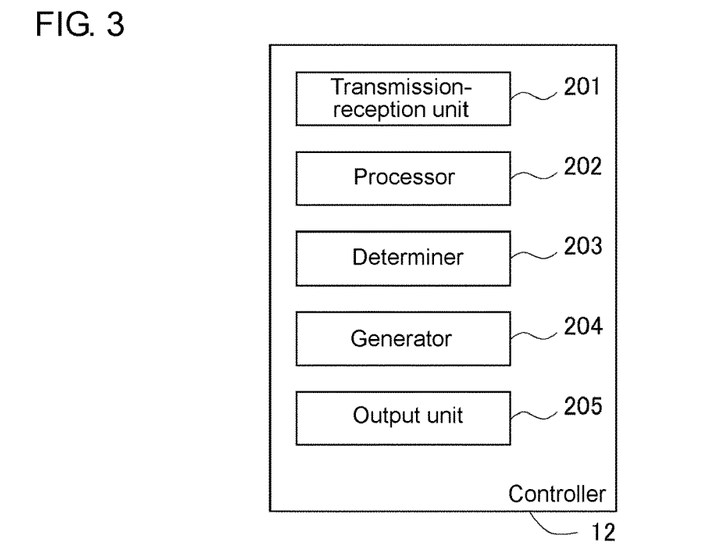
FIG. 3 is a diagram of a controller showing its example functional components.

The controller 12 performs object detection using the signal output from the radar sensor 11. The object detection includes calculating the distance and the direction from the vehicle 1 to the object. FIG. 3 is a diagram of the controller 12 showing its example functional components. The controller 12 includes, as its functional components, a transmission-reception unit 201, a processor 202, a determiner 203, a generator 204, and an output unit 205. The transmission-reception unit 201, the processor 202, the determiner 203, the generator 204, and the output unit 205 are functional components implemented by, for example, the processor executing various programs stored in the memory.

The transmission-reception unit 201 controls transmission and reception of the radar wave by the radar sensor 11. The transmission-reception unit 201 causes the synthesizer 101 to output a chirp and obtains an intermediate frequency signal from the mixer 104. The processor 202 performs object detection based on, for example, the intermediate frequency signal. The processor 202 calculates the distance and the direction to the object based on the signal from the transmission-reception unit 201. The processor 202 calculates the reflected power level of the reflected wave based on the signal from the transmission-reception unit 201. The reflected power level may be, for example, received electric power or received signal intensity. Any known technique may be used for the calculation.

The determiner 203 determines, based on the reflected power level of the reflected wave, whether a travel-restricted area is to be defined. The travel-restricted area may be defined as an area in which the vehicle 1 is restricted from traveling. The travel-restricted area may be defined as an area in which an object is difficult to detect. For example, the determiner 203 determines whether the reflected wave from a detected object has a reflected power level higher than or equal to a predetermined value. In response to the reflected power level being higher than or equal to the predetermined value, the determiner 203 determines that the travel-restricted area is to be defined. The predetermined value is a threshold for the reflected power level to determine an area in which an object is difficult to detect. For another object located adjacent to a detected object, the predetermined value is, for example, the reflected power level at which the other object is undetectable. The predetermined value may be obtained by, for example, experiment or simulation. The predetermined value may have some margin. More specifically, the predetermined value may be lower than the reflected power level at which the other object is undetectable.

The generator 204 generates information about the travel-restricted area. The information about the travel-restricted area includes, for example, information about the coordinates indicating the outer edge of the travel-restricted area. The generator 204 determines the travel-restricted area for the object based on the reflected power level and the information stored in the memory. To determine the travel-restricted area, the peak value of the reflected power level is used, for example. The travel-restricted area can be determined based on a travel-restricted distance from the position (point) at which an object is detected. The travel-restricted distance is the maximum distance from the object within which the vehicle 1 is restricted from traveling. The travel-restricted distance corresponds to the distance from the object to the outer edge of the travel-restricted area. The information about the travel-restricted distance corresponding to the reflected power level may be determined by experiment or simulation and stored in the memory. The travel-restricted distance is defined to reflect the separation resolution and the detection error of the radar. The area in which another object is difficult to detect changes depending on the separation resolution and the detection error of the radar. The travel-restricted distance is thus defined for the travel-restricted area to include the area in which another object is difficult to detect. The separation resolution and the detection error of the radar sensor 11 may be obtained based on, for example, the specifications of the radar sensor 11.

Figure 4:
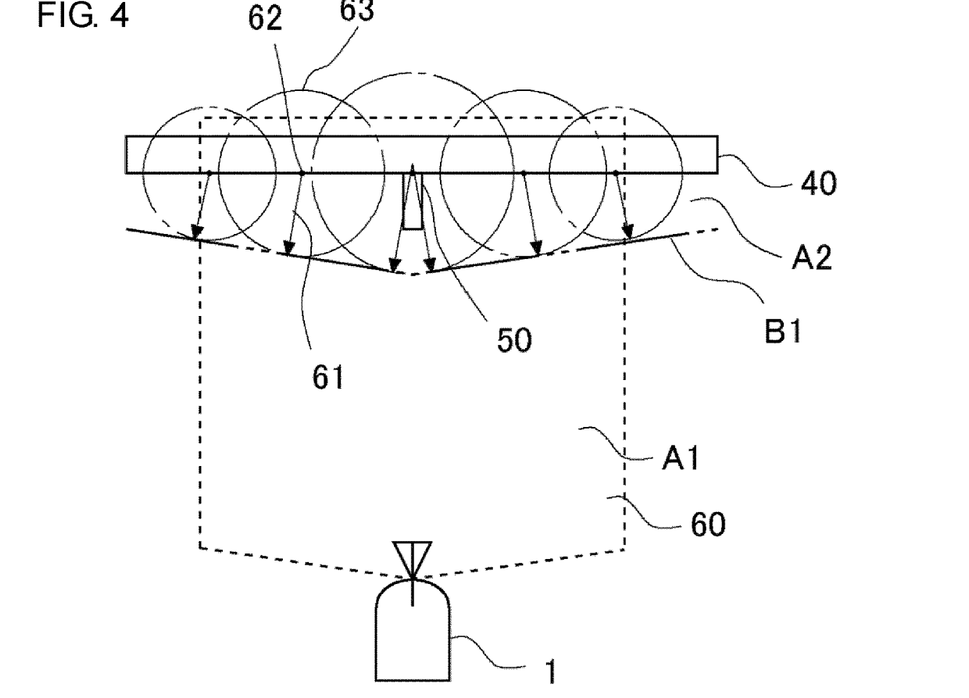
FIG. 4 is a diagram describing a travel-restricted distance and a travel-restricted area in the embodiment.

FIG. 4 is a diagram describing the travel-restricted distance and the travel-restricted area in the embodiment. FIG. 4 illustrates a metal wall 40 in front of the vehicle 1, and a metal rod 50 near the metal wall 40 between the vehicle 1 and the metal wall 40. In the example shown in FIG. 4, the straight-traveling direction of the vehicle 1 is orthogonal to the surface of the metal wall 40. The direction of the radar wave is thus orthogonal to the surface of the metal wall 40. In this case, the metal wall 40 corresponds to an object that reflects a wave with a relatively high level of reflected power. The metal rod 50 corresponds to another object that reflects a wave with a relatively low level of reflected power. The dashed line 60 in FIG. 4 shows the outer edge of the radar coverage (monitoring area A1). The arrows 61 in FIG. 4 each indicate the travel-restricted distance for a corresponding position 62 on the metal wall 40. The radar sensor 11 receives the reflected wave from each position 62 on the metal wall 40. The metal wall 40 is thus detected as a point cloud. The dot-and-dash lines 63 in FIG. 4 each indicate the outer edge of the travel-restricted area for a corresponding position 62 on the metal wall 40.

In FIG. 4, the metal wall 40 has a relatively large radar cross-section (RCS) and easily reflects the radar wave. Thus, the reflected wave from the metal wall 40 is received by the radar sensor 11 with a relatively high level of reflected power. The metal rod 50 has a smaller RCS than the metal wall 40. Thus, the reflected wave from the metal rod 50 is received with a lower level of reflected power. In response to the presence of an object with a large RCS in the monitoring area A1, the radar sensor 11 may fail to detect another object with a small RCS located near the object with the large RCS. In other words, the reflected wave from the other object with the small RCS may be less noticeable in the reflected wave from the object with the large RCS, causing the waves to be non-separable from each other. This may cause the metal rod 50 in front of the metal wall 40 to be undetectable. In this case, the reflected wave from the metal wall 40 has a reflected power level higher than or equal to a predetermined value. The determiner 203 thus determines that the travel-restricted area is to be defined adjacent to the metal wall 40.

The generator 204 then defines a travel-restricted area adjacent to the metal wall 40 and generates information about the travel-restricted area. In the metal wall 40 shown in FIG. 4, the reflected power level is the highest in front of the vehicle 1 and is lower at a longer distance from the front toward the left and right with a smaller incident angle of the radar wave onto the metal wall 40. The reflected wave from the metal wall 40 having a lower level of reflected power allows easier detection of the reflected wave from another object. Thus, the travel-restricted distance for a position 62 on the metal wall 40 is the longest in front of the vehicle 1 and is shorter at a longer distance from the front toward the left and right. The travel-restricted distance for each position 62 on the metal wall 40 is associated with the reflected power level, the separation resolution (which may be the frequency band), and the detection error. The travel-restricted distance may thus be defined in accordance with the reflected power level, the separation resolution, and the detection error. The separation resolution and the detection error may be predetermined. Using these parameters, the relationship between the reflected power level and the travel-restricted distance may be predetermined. This allows the travel-restricted distance to be determined in accordance with the reflected power level. The area around each position 62 within the travel-restricted distance is defined as the travel-restricted area for the position 62. In this case, multiple travel-restricted areas are defined for the metal wall 40. The two-dot chain line B1 in FIG. 4 may define the outer edge of a travel-restricted area A2 for the entire metal wall 40. The two-dot chain line B1 indicates a tangent to the outer edge 63 of the travel-restricted area for each position 62 on the metal wall 40. The two-dot chain line B1 may not be a straight line.

Figure 5:
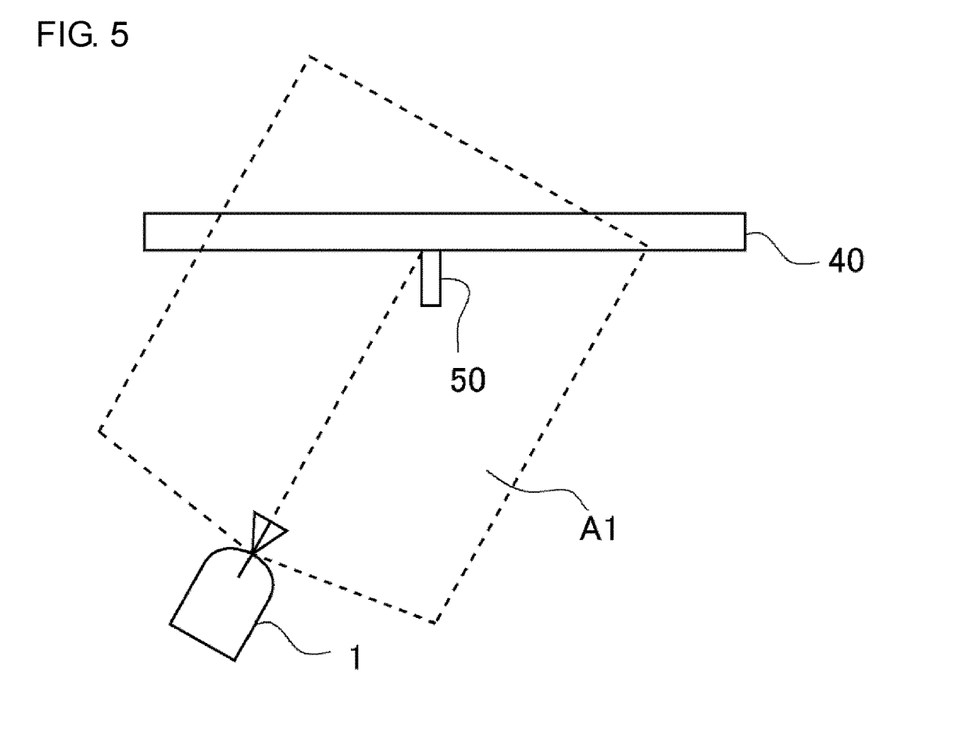
FIG. 5 is a diagram describing a situation with no travel-restricted area being defined.

FIG. 5 is a diagram describing a situation with no travel-restricted area being defined. For the vehicle 1 traveling diagonally to the metal wall 40, a reflected wave from the metal wall 40 can have a lower level of reflected power than for the vehicle 1 traveling orthogonally to the surface of the metal wall 40. In this case, the reflected wave from the metal rod 50 may be separable from the reflected wave from the metal wall 40. The processor 202 can then detect the metal rod 50 in front of the metal wall 40. In this case, the reflected power level is lower than the predetermined value. The determiner 203 thus determines that the travel-restricted area is not to be defined. The generator 204 thus generates no information about the travel-restricted area.

The output unit 205 then outputs information about the travel-restricted area to the travel controller 13. The output information includes, for example, the coordinates of the outer edge of the travel-restricted area. The output unit 205 also outputs information about the detected object to the travel controller 13. The information may include, for example, information about the distance and the direction from the vehicle 1 to the object calculated by the processor 202.

(Structure of Travel Controller)

The travel controller 13 is a computer for controlling the travel of the vehicle 1 and includes, for example, a processor and a memory. The processor and the memory are the same as those in the controller 12 and thus are not described repeatedly. The controller 12 and the travel controller 13 may be implemented by a single computer.

The travel controller 13 generates a control command for controlling the autonomous travel of the vehicle 1 based on the operation plan input by the user and on the information output from the output unit 205. The operation plan may be prestored in the memory. For example, the travel controller 13 generates a control command to cause the vehicle 1 to travel along a predetermined travel-permitted area in accordance with the operation plan while preventing obstacles from entering a predetermined area around the vehicle 1 and preventing the vehicle 1 from entering the travel-restricted area. The generated control command is transmitted to the drive 14. To generate the control command for the autonomous travel of the vehicle 1, any known method may be used.

(Structure of Drive)

The drive 14 causes the vehicle 1 to travel based on the control command generated by the travel controller 13. The drive 14 includes, for example, a motor, an inverter, a brake, and steering for driving the wheels of the vehicle 1. These components are driven in accordance with the control command to allow the autonomous travel of the vehicle 1.

(Operation of Controller 12)

Figure 6:
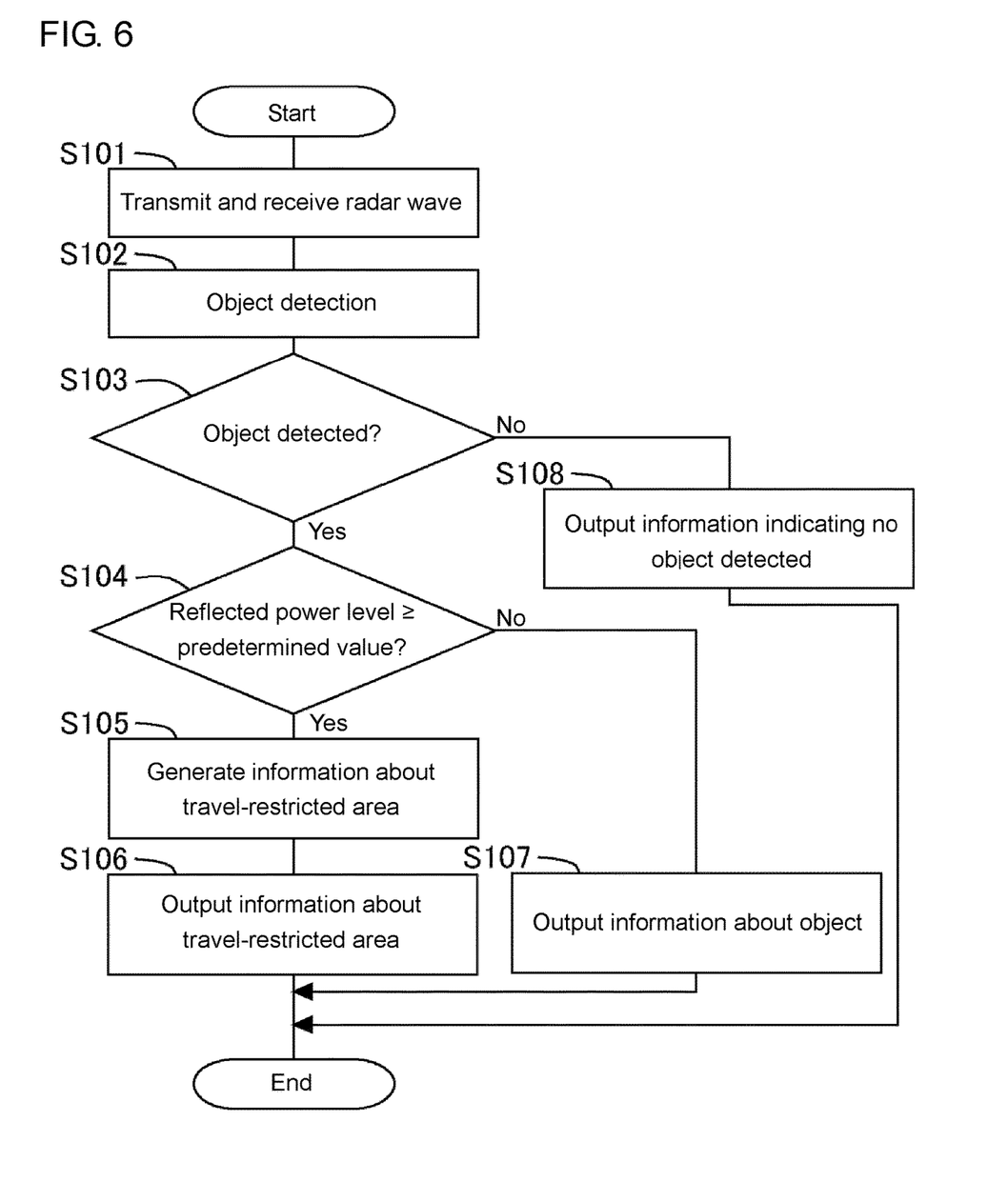
FIG. 6 is a flowchart showing a control sequence performed by the controller in the embodiment.

FIG. 6 is a flowchart showing a control sequence performed by the controller 12 in the embodiment. The processing in the flowchart is repeatedly performed by the controller 12 at predetermined time intervals. The vehicle 1 operates in accordance with the operation plan prestored in the memory.

In step S101, the transmission-reception unit 201 transmits and receives a radar wave. In step S102, the processor 202 performs object detection. More specifically, the processor 202 calculates the position (distance and direction) and the reflected power level of the object based on the output from the radar sensor 11. In step S103, the processor 202 determines whether an object has been detected through the object detection. In response to an affirmative determination result in step S103, the processing advances to step S104. In response to a negative determination result in step S103, the processing advances to step S108. In step S108, the output unit 205 outputs, to the travel controller 13, information indicating no object detected.

In step S104, the determiner 203 determines whether the reflected wave from the detected object has a reflected power level higher than or equal to a predetermined value. In other words, the determiner 203 determines whether a travel-restricted area is to be defined. In response to an affirmative determination result in step S104, the processing advances to step S105. In response to a negative determination result in step S104, the processing advances to step S107.

In step S105, the generator 204 generates information about the travel-restricted area. The generator 204 obtains, based on the reflected power level and information stored in the memory (e.g., information about the travel-restricted distance corresponding to the reflected power level), the travel-restricted distance from the position having the reflected power level detected. The generator 204 then determines the travel-restricted distance from each position having the reflected power level higher than or equal to the predetermined value. The generator 204 thus determines the travel-restricted area for each position. The generator 204 may determine a travel-restricted area for the entire object based on the travel-restricted distance for each position.

In step S106, the output unit 205 outputs the information about the travel-restricted area to the travel controller 13. In step S107, the output unit 205 outputs the information about the object to the travel controller 13.

Upon receiving a signal from the controller 12, the travel controller 13 controls the travel of the vehicle 1 based on the signal. In response to the travel controller 13 obtaining information about the object, or in other words, in response to information about the object being output in step S107, the travel controller 13 changes the movement direction of the vehicle 1 or decelerates or stops the vehicle 1 to avoid contact with the object. In response to the travel controller 13 obtaining information about the travel-restricted area, or in other words, in response to information about the travel-restricted area being output in step S106, the travel controller 13 changes the movement direction of the vehicle 1 or decelerates or stops the vehicle 1 to prevent the entry of the vehicle 1 into the travel-restricted area. For an overlap between the travel-permitted area and the travel-restricted area, for example, the travel-permitted area may be smaller by the area of overlap, and the vehicle 1 may travel along the smaller travel-permitted area. In response to no object being detected, or in other words, in response to information indicating no object detected being output in step S108, the vehicle 1 is controlled in accordance with the operation plan.

Advantages of Embodiments

In the apparatus described above, the radar sensor 11 can detect an object located in the vertical direction, as well as in the horizontal direction. This structure allows avoiding collision with, for example, an obstacle located in a three-dimensional space. The apparatus defines a travel-restricted area based on the reflected power level of a reflected wave from a detected object. For example, an object having a high level of reflected power is present, and another object having a low level of reflected power is located near the object. The apparatus allows the vehicle 1 to avoid colliding with the other object that may be difficult to detect. The apparatus can have the existing hardware configuration and thus can reduce cost.

Modifications

Figure 7:
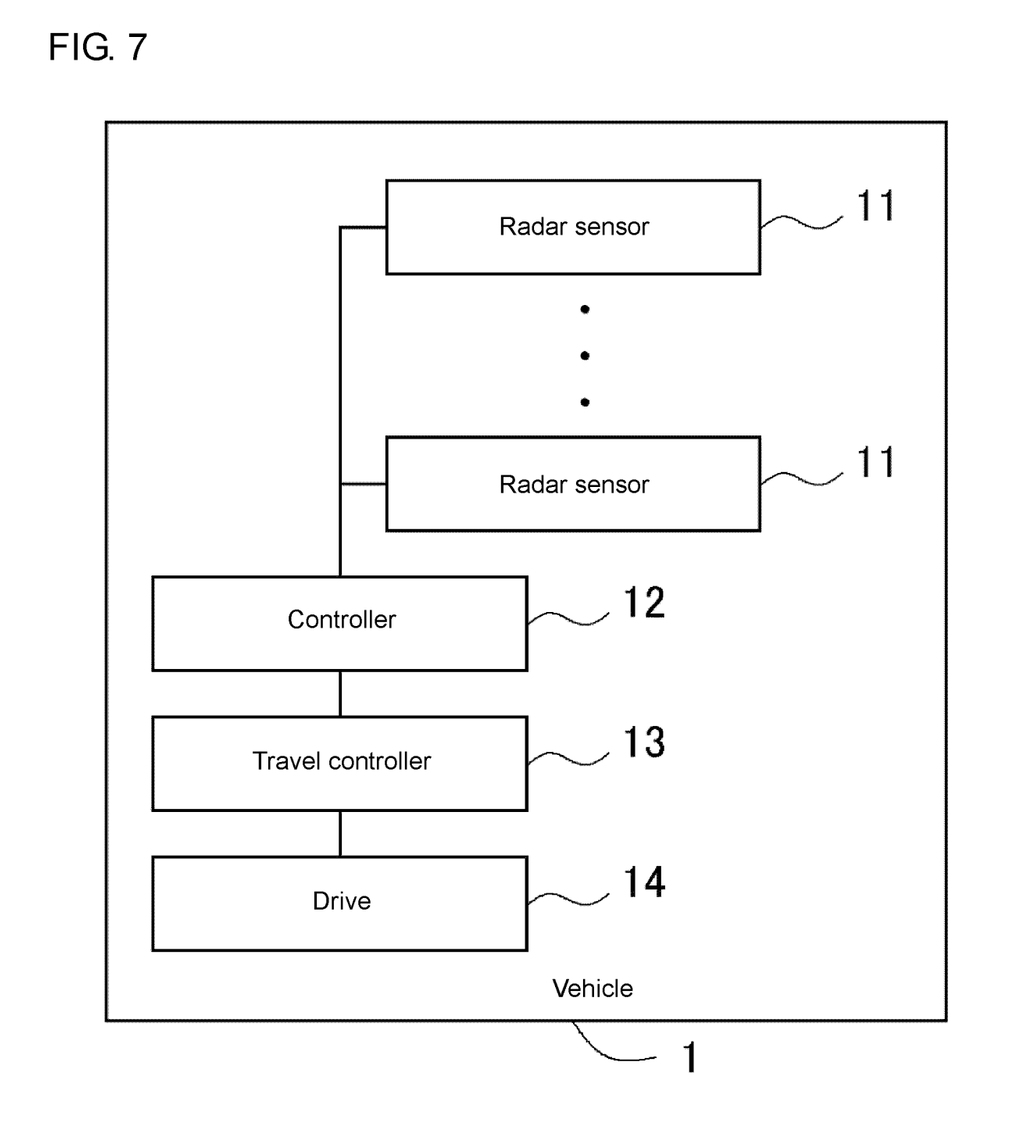
FIG. 7 is a schematic block diagram of a vehicle in a modification.

FIG. 7 is a schematic block diagram of the vehicle 1 in a modification. The vehicle 1 in the present modification includes multiple radar sensors 11 having different directions of radar waves. The components specific to the present modification are described below without describing the components that are the same as those in the above embodiments.

An object that easily reflects a radar wave, such as the metal wall 40, as described in FIGS. 4 and 5 can reflect a radar wave with a relatively low level of reflected power when the radar wave is diagonally incident on the wall surface. The metal rod 50 near the metal wall 40 is then detectable. In this case, the position of the metal rod 50 is not to be included in the travel-restricted area. The travel controller 13 may simply control the vehicle 1 to avoid the detected metal rod 50 while traveling.

The radar sensors 11 having different directions of radar waves can cause the radar waves to be incident on the same object at different angles. The reflected waves from the same object may have different levels of reflected power for different radar sensors 11. Thus, different travel-restricted areas may be defined for different radar sensors 11 for the same object. The radar sensors 11 in the present modification each detect the same object (points) to produce a signal. From the signals output from the radar sensors 11, a signal of the reflected wave having the lowest level of reflected power is selected. Based on the selected signal, the travel-restricted area is defined for the object.

The processing performed in this case will now be described with reference to FIG. 6. In step S101, the transmission-reception unit 201 transmits and receives a radar wave for each radar sensor 11. In step S102, the processor 202 calculates the position (distance and direction) and the reflected power level of an object based on the output from each radar sensor 11. In step S103, the processor 202 determines whether an object has been detected through the object detection. The determination result may be affirmative in response to any of the radar sensors 11 detecting an object.

In step S104, the determiner 203 determines whether the reflected waves from the object detected by the radar sensors 11 have reflected power levels all higher than or equal to a predetermined value. In step S105, the generator 204 selects, from signals output from the radar sensors 11, a signal of the reflected wave having the lowest level of reflected power. Based on the selected signal, the generator 204 generates information about the travel-restricted area for the object.

In step S106, the output unit 205 outputs the information about the travel-restricted area to the travel controller 13. In step S107, the output unit 205 outputs the information about the object to the travel controller 13. In step S108, the output unit 205 outputs, to the travel controller 13, information indicating no object detected.

A minimum travel-restricted area is thus defined based on a signal of a reflected wave having the lowest level of reflected power. The reflected waves detected for the same object may, for example, include reflected waves having reflected power levels higher than or equal to the predetermined value and reflected waves having reflected power levels lower than the predetermined value. In this case, the travel-restricted area may not be defined.

With the minimum travel-restricted area being defined, the vehicle 1 can have a maximum travel-permitted area with a minimum chance of collision with objects. The vehicle 1 is also less likely to decelerate or stop unintendedly.

<Others>

The above embodiments describe exemplary structures according to one or more aspects of the present invention. The present invention is not limited to the specific embodiments described above, but may be modified variously within the scope of the technical ideas of the invention.

For example, the vehicle is an AGV in the above embodiments. In some embodiments, the technique may be used for an autonomous vehicle for purposes other than transportation. The controller 12 in the above embodiments is included in the vehicle 1. In some embodiments, the controller 12 may be at least partially located outside the vehicle 1.

The travel-restricted distance in the above embodiments is longer for a reflected wave from an object having a higher level of reflected power. In some embodiments, the travel-restricted distance may be constant for a reflected power level higher than or equal to a predetermined value. In this case, the travel-restricted distance may be defined to accommodate the highest level of reflected power, for example.

The generator 204 in the above embodiments generates information about the travel-restricted area in accordance with the reflected power level of the reflected wave from an object. In some embodiments, the information may indicate that a virtual object is located at the outer edge (e.g., the two-dot chain line B1 in FIG. 4) of the travel-restricted area. In this case, the travel controller 13 generates a control command to avoid the virtual object.

APPENDIX 1

(1) A collision avoidance apparatus for an autonomous vehicle including at least one radar sensor 11 for transmitting a radar wave and receiving a reflected wave from an object, the apparatus comprising:
  a processor 202 configured to obtain, from a signal received by the at least one radar sensor 11, information about a position of the object and information about a reflected power level of the reflected wave;
  a generator 204 configured to generate, in response to the reflected power level being higher than or equal to a predetermined value, information about a travel-restricted area, the travel-restricted area being an area adjacent to the object and in which the autonomous vehicle is restricted from traveling; and
  an output unit 205 configured to output the information about the travel-restricted area.

REFERENCE SIGNS LIST

1 vehicle
11 radar sensor
12 controller
13 travel controller
14 drive
102 transmitting antenna
103 receiving antenna
201 transmission-reception unit
202 processor
203 determiner
204 generator
205 output unit

The invention claimed is:

1. A control apparatus for an autonomous vehicle including at least one radar sensor for transmitting a radar wave and receiving a reflected wave from an object, the control apparatus comprising:
  a processor configured to obtain, from a signal received by the at least one radar sensor, information about a position of the object and information about a reflected power level of the reflected wave;
  a generator configured to set an area around the object within a predetermined travel-restricted distance, in response to the reflected power level being higher than or equal to a predetermined value, as a travel-restricted area in which the autonomous vehicle is restricted from traveling and to generate information about the travel-restricted area; and
  a travel controller configured to control travel of the autonomous vehicle, wherein
  the travel controller controls the travel of the autonomous vehicle to prevent entry of the autonomous vehicle into the travel-restricted area based on the information about the travel-restricted area in a case that the reflected power level of the object is higher than or equal to the predetermined value, and controls the travel of the autonomous vehicle to avoid contact with the object based on the information about the position of the object in a case that the reflected power level of the object is lower than the predetermined value.

2. The control apparatus according to claim 1, wherein the generator generates the information about the travel-restricted area to define a longer distance from the object to an outer edge of the travel-restricted area for the reflected power level being higher.

3. The control apparatus according to claim 1, wherein the at least one radar sensor includes a plurality of radar sensors having different directions, and
  the generator generates the information about the travel-restricted area based on a signal, among signals received by the plurality of radar sensors, having a lowest level of reflected power obtained by the processor.

4. A control method for an autonomous vehicle including a radar sensor for transmitting a radar wave and receiving a reflected wave from an object, the method being implementable by a computer, the control method comprising:
  obtaining, from a signal received by the radar sensor, information about a position of the object and information about a reflected power level of the reflected wave;

setting an area around the object within a predetermined travel-restricted distance, in response to the reflected power level being higher than or equal to a predetermined value, as a travel-restricted area in which the autonomous vehicle is restricted from traveling;

generating information about the travel-restricted area; and controlling travel of the autonomous vehicle (i) to prevent entry of the autonomous vehicle into the travel-restricted area based on the information about the travel-restricted area in a first case where the reflected power level of the object is higher than or equal to the predetermined value and (ii) to avoid contact with the object based on the information about the position of the object in a second case where the reflected power level of the object is lower than the predetermined value.

5. A non-transitory computer readable medium storing a control program for an autonomous vehicle including a radar sensor for transmitting a radar wave and receiving a reflected wave from an object, the control program causing a computer to perform operations comprising:

obtaining, from a signal received by the radar sensor, information about a position of the object and information about a reflected power level of the reflected wave;

setting an area around the object within a predetermined travel-restricted distance, in response to the reflected power level being higher than or equal to a predetermined value, as a travel-restricted area in which the autonomous vehicle is restricted from traveling;

generating information about the travel-restricted area; and controlling travel of the autonomous vehicle (i) to prevent entry of the autonomous vehicle into the travel-restricted area based on the information about the travel-restricted area in a first case where the reflected power level of the object is higher than or equal to the predetermined value and (ii) to avoid contact with the object based on the information about the position of the object in a second case where the reflected power level of the object is lower than the predetermined value.

6. The control apparatus according to claim 2, wherein the at least one radar sensor includes a plurality of radar sensors having different directions, and the generator generates the information about the travel-restricted area based on a signal, among signals received by the plurality of radar sensors, having a lowest level of reflected power obtained by the processor.

* * * * *